Sept. 7, 1954  R. F. E. STEGEMAN  2,688,135
MEANS FOR MOUNTING SIDE SHIELDS ON GOGGLES
Filed March 27, 1953
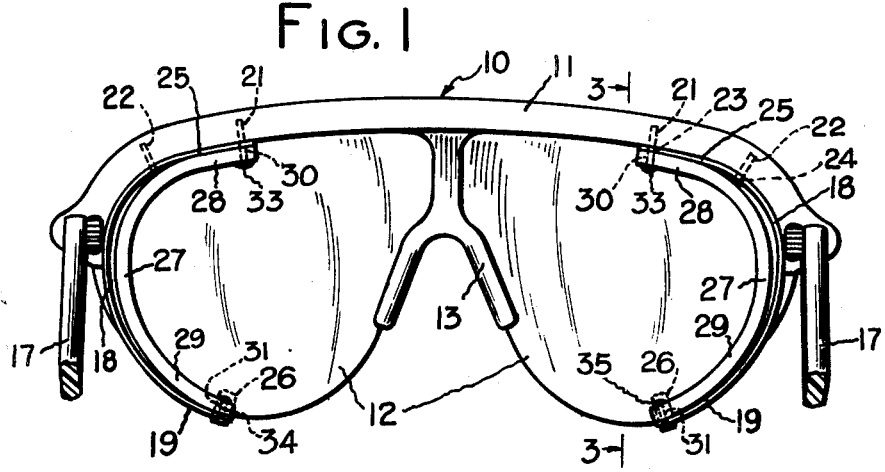
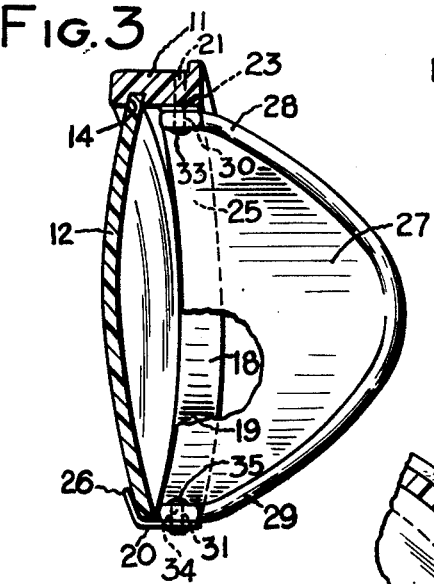
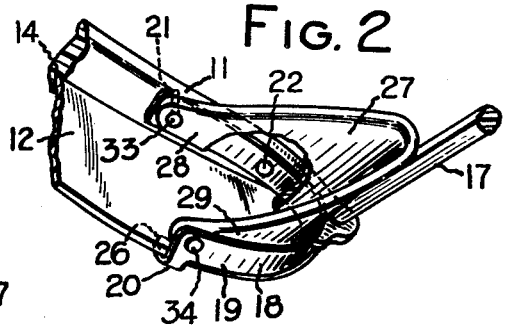
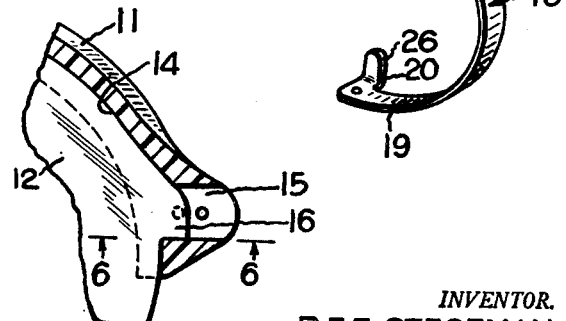
INVENTOR.
R. F. E. STEGEMAN
BY
ATTORNEY Patented Sept. 7, 1954

2,688,135

UNITED STATES PATENT OFFICE 2,688,135

MEANS FOR MOUNTING SIDE SHIELDS ON GOGGLES

Raymond F. E. Stegeman, Greece, N. Y., assignor to Bausch & Lomb Optical Company, Rochester, N. Y., a corporation of New York Application March 27, 1953, Serial No. 345,178

3 Claims. (Cl. 2—14)

This invention relates to an improved goggle and has particular reference to a novel means for mounting a side shield along the edge of a semi-rimless goggle.

In a type of goggle now in wide commercial use, a plastic lens member is supported along its upper edge portion by a brow bar. The lens member has no frame around the lower portion of the lens and hence it is not possible to pivotally mount the lower part of a side shield in the customary manner.

A principal object of my invention is to provide a means for pivotally mounting a side shield on a goggle of the above noted type.

Another object of my invention is to provide a goggle of the semi-rimless type with a convenient means for fastening a side shield along the rimless part of the lens without altering the lens construction.

A further object of my invention is to provide a goggle with means for attaching a side shield to the lens of the goggle without complicating the removability of the lens of the goggle.

Other objects and advantages pertaining to the form and relation of parts thereof will more readily appear from the following description taken in connection with the accompanying drawings, in which:

Fig. 1 is a rear elevational view of a goggle embodying my invention.

Fig. 2 is a perspective view from the rear of the goggle showing one side shield in assembled position.

Fig. 3 is a cross-sectional view taken along line 3—3 in Fig. 1.

Fig. 4 is a perspective view of the support element of my invention.

Fig. 5 is a sectional view taken through a temporal portion of the brow bar showing the means for attaching the lens.

Fig. 6 is a cross-sectional view on line 6—6 of Fig. 5.

A preferred embodiment of my invention is shown in the drawings wherein a goggle or eye-shield 10 has a flexible brow bar 11 extending only along the upper portion and partially down the temporal portions of a one-piece transparent lens member 12 which has a reentrant section in the central portion for receiving a nose rest 13 depending downwardly from the brow bar 11. The lens member 12, having no frame or rim around its lower portion, is adapted to be supported along its upper edge portion in a groove 14 in the brow bar and is held therein by the coaction between the recesses 15 in the temporal portions of the brow bar and the lateral projections 16 on the lens 12. When it is desired to remove the lens member 12 from the goggle, it is a simple matter to spread the temporal portions of the brow bar 11 so as to release the projections 16 on the lens from the recesses 15 in the brow bar for removal of the lens from the goggle. Pivotally attached to the temporal edge portions of the brow bar 11 is a pair of temples 17 which extend rearwardly therefrom.

A support member 18, made of any suitable resilient material and having an arcuate shape that substantially conforms to the temporal edge portion of the lens member 12, is provided on its lower end portion 19 with an integrally formed, laterally extending clip member 20. The support member 18 is fastened to the underside of the brow bar 11 by the pins 21 and 22 which extend through the apertures 23, 24 in the upper end portion 25 of the support member 18. The clip member 20 extends outwardly and upwardly from the support member 18 to form a finger 26 which engages with the lower edge portion of the lens 12 for holding the support member relative to the lens.

A side shield 27, arcuately shaped as usual to close the space between the lens and the face of the wearer, is provided, respectively, in its upper and lower parts 28 and 29 with the apertures 30 and 31. The pin 21 with head 33 extends through the aperture 30 in the upper part of the side shield 27 and is fastened in the brow bar 11 whereby the upper part of the side shield is pivotally mounted on the brow bar. The pin or trunnion 34 on the lower end portion 19 of the support member is pivotally held in the lower part 29 of the side shield by the head 35 on the pin 34 whereby the lower part of the side shield is pivotally mounted on the support member. It is readily seen that the side shield 27 is free to pivot about the pins 21 and 34 relative to the lens 12 and support member 18 either into inoperative position against the lens or into operative position along the temples 17 as shown in Fig. 2.

When it is desired to remove a lens member 12 from the goggle, the support member 18 is expanded to disengage the finger 26 of the clip 20 from the lower portion of the lens 12 so that the lens can be removed in the manner above described. A new lens can be inserted, or the old one cleaned and replaced, without requiring any special attachments on the lens or special tools for removing the side shield from the lens.

It should be understood that the specific goggle here disclosed is not part of the invention. Any goggle or eyeshield of the type which has no frame around the lower portion of the lens and wherein a side shield is to be attached directly to an edge of the lens is to be understood to be within the scope of this invention.

From the foregoing it will be apparent that I am able to attain the objects of my invention and to provide an improved means for mounting a side shield along the edge of a lens. The support member 18 is made of resilient material which permits fairly rigid support for a side shield along the edge of the lens and also permits ready expansion of the support for removal of the lens. Various modifications may obviously be made without departing from the spirit of my invention as pointed out in the appended claims.

I claim:

1. In a goggle, the combination of a lens, a brow bar extending only along the upper portion of the lens, means for attaching the lens to the brow bar, a support member having its upper end portion fastened to the brow bar rearwardly of the lens and extending downwardly along the temporal edge of the lens, clip means laterally extending from the lower end portion of the support member in engagement with the lower edge portion of the lens for holding the support member relative to the lens, a side shield having apertures in its upper and lower parts, a pivot means fastened to the brow bar and projecting downwardly into the aperture in the upper part of the side shield, and a pivot means on the lower end portion of the support member projecting upwardly into the aperture in the lower part of the side shield whereby the side shield is pivotally mounted along the temporal edge portion of the lens.

2. In a goggle, the combination of a lens, a brow bar extending only along the upper portion of the lens, means for attaching the lens to the brow bar, a side shield having apertures in its upper and lower parts, and means for pivotally mounting the side shield along the temporal edge portion of the lens comprising a support member having its upper end portion fastened to the brow bar and extending downwardly along a temporal edge of the lens, clip means laterally extending from the lower end portion of the support member, said last-named means engaging with the lower edge portion of the lens for positioning the support member relative to the lens, a pivot means projecting downwardly from the brow bar into pivotal relation with the aperture in the upper part of the side shield, and a pivot means on the lower end portion of the support member projecting upwardly into the aperture in the lower part of the side shield whereby the side shield is pivotally mounted along the temporal edge portion of the lens.

3. In a goggle having a lens, a brow bar extending only along the upper portion of the lens, and means for attaching the lens to the brow bar, the combination of an arcuately shaped support member having its upper end portion fastened to the brow bar, clip means laterally extending from the lower end portion of the support, said clip means engaging with the lower edge portion of the lens for holding the support member relative to the lens, a side shield having upper and lower parts, means for pivotally mounting the upper part of the side shield on the brow bar and means for pivotally mounting the lower part of the side shield on the lower end portion of the support member whereby the side shield is pivotally mounted on the support member.

References Cited in the file of this patent

UNITED STATES PATENTS

| Number | Name | Date |
| --- | --- | --- |
| 1,177,219 | Willson | Mar. 28, 1916 |
| 2,529,110 | Splaine | Nov. 7, 1950 |